(12) United States Patent
Garcia et al.

(10) Patent No.: US 10,116,379 B2
(45) Date of Patent: Oct. 30, 2018

(54) SCHEDULING BEAMS OF A SATELITE ANTENNA

(71) Applicant: Aireon LLC, McLean, VA (US)

(72) Inventors: Michael A. Garcia, Ashburn, VA (US); Boris Veytsman, McLean, VA (US)

(73) Assignee: Aireon LLC, McLean, VA (US)

( * ) Notice: Subject to any disclaimer, the term of this patent is extended or adjusted under 35 U.S.C. 154(b) by 0 days.

(21) Appl. No.: 15/462,396

(22) Filed: Mar. 17, 2017

(65) Prior Publication Data

US 2018/0269958 A1    Sep. 20, 2018

(51) Int. Cl.
*H04B 7/185* (2006.01)
*G08G 5/00* (2006.01)

(52) U.S. Cl.
CPC ....... *H04B 7/18513* (2013.01); *G08G 5/0008* (2013.01); *H04B 7/18508* (2013.01); *H04B 7/18582* (2013.01)

(58) Field of Classification Search
CPC ...... H04B 7/185; H04B 7/204; H04B 7/2041; H04B 7/1851; H04B 7/18513; H04B 7/18515; H04B 7/18519; H04B 7/19521; H04B 7/18534; H04B 7/18543; H04W 72/04

USPC ... 455/12.1, 13.1, 13.2, 13.3, 13.4, 427, 429
See application file for complete search history.

(56) References Cited

U.S. PATENT DOCUMENTS

| 9,748,989 B1* | 8/2017 | Freedman ............... H04B 1/12 |
| 2004/0072570 A1* | 4/2004 | Smith ................ H04B 7/2041 455/446 |
| 2017/0288753 A1* | 10/2017 | Vasavada ............ H04B 7/0619 |

* cited by examiner

*Primary Examiner* — Philip Sobutka
(74) *Attorney, Agent, or Firm* — Baker Botts L.L.P.

(57) ABSTRACT

In one implementation, a method for scheduling beams of an antenna on a satellite during a defined time period includes calculating a beam score for each beam based on the expected gain of the beam and determining that the number of beams having non-zero beam scores during the defined time period is less than a threshold value. In addition, the method also includes accessing a set of beam weights for each of multiple different candidate beam patterns, and, for each set of weights, multiplying individual beam weights by corresponding beam scores, and generating a candidate beam pattern score by calculating a sum of the products of the beam weights and corresponding beam scores. The method further includes comparing the candidate beam pattern scores, selecting a particular one of the candidate beam patterns, and scheduling the selected beam pattern for the defined time period.

20 Claims, 7 Drawing Sheets

SCHEDULING BEAMS OF A SATELITE ANTENNA

TECHNICAL FIELD

The disclosure relates generally to provisioning satellite coverage.

SUMMARY

According to one implementation of the disclosure, a method for scheduling beams of an antenna on a satellite during a defined time period includes calculating a beam score for each beam based on the expected gain of the beam and determining that the number of beams having non-zero beam scores during the defined time period is less than a threshold value. In addition, the method also includes accessing a set of beam weights for each of multiple different candidate beam patterns, and, for each set of weights, multiplying individual beam weights by corresponding beam scores, and generating a candidate beam pattern score by calculating a sum of the products of the beam weights and corresponding beam scores. The method further includes comparing the candidate beam pattern scores, selecting a particular one of the candidate beam patterns, and scheduling the selected beam pattern for the defined time period.

Other features of the present disclosure will be apparent in view of the following detailed description of the disclosure and the accompanying drawings. Implementations described herein, including the above-described implementations, may include a method or process, a system, or computer-readable program code embodied on computer-readable media.

BRIEF DESCRIPTION OF THE DRAWINGS

For a more complete understanding of the present disclosure, reference now is made to the following description taken in connection with the accompanying drawings.

DETAILED DESCRIPTION

Traditionally, air traffic control, aircraft surveillance, and flight path management services have relied on ground-based radar stations and surveillance data processing systems. These systems rely on aircraft-based radio transmitters and terrestrial interrogation and receiving stations to implement systems, such as, for example, primary surveillance radar ("PSR"), secondary surveillance radar ("SSR"), and/or mode select ("Mode S") radar, for communicating aircraft position and monitoring information to local ground stations. The information received at the local ground stations is then relayed to regional or global aircraft monitoring systems. Such conventional radar-based systems for use in air traffic control, aircraft surveillance, and flight path management services are limited to use in regions in which the appropriate ground infrastructure exists to interrogate and receive messages from aircraft. Consequently, vast areas of the world's airspace (e.g., over the oceans and poles, remote and/or mountainous regions, etc.) are not monitored by conventional, terrestrial radar-based systems.

Recently, modernization efforts have been launched to replace radar-based air traffic control, aircraft surveillance, and flight management systems with more advanced automatic dependent surveillance-broadcast ("ADS-B") based systems. In an ADS-B-based system, an aircraft determines its position using a satellite-based navigation system (e.g., the Global Positioning System ("GPS")) and periodically broadcasts its position and, in some cases, other information (e.g., velocity, time, and/or intent, among other information), thereby enabling the aircraft to be tracked. ADS-B-based systems may utilize different data links and formats for broadcasting ADS-B messages. 1090 MHz Mode S ES is an example of one such data link which has been adopted in many jurisdictions. For example, in the United States, the Federal Aviation Administration ("FAA") has mandated 1090 MHz Mode S ES for use by air carrier and private or commercial operators of high-performance aircraft. Like traditional radar-based systems, ADS-B-based systems require appropriate infrastructure for receiving ADS-B messages broadcast by aircraft. As a result, even as numerous jurisdictions transition to terrestrial, ADS-B-based systems, air traffic in vast airspaces remains unmonitored.

To address this limitation of terrestrial ADS-B systems, satellite-based receivers can be used to receive ADS-B messages broadcast by aircraft, and such ABS-B messages then can be relayed back down to earth terminals or other terrestrial communications infrastructure for transmission to and use by air traffic control, aircraft surveillance, and flight path management services.

Figure 1:
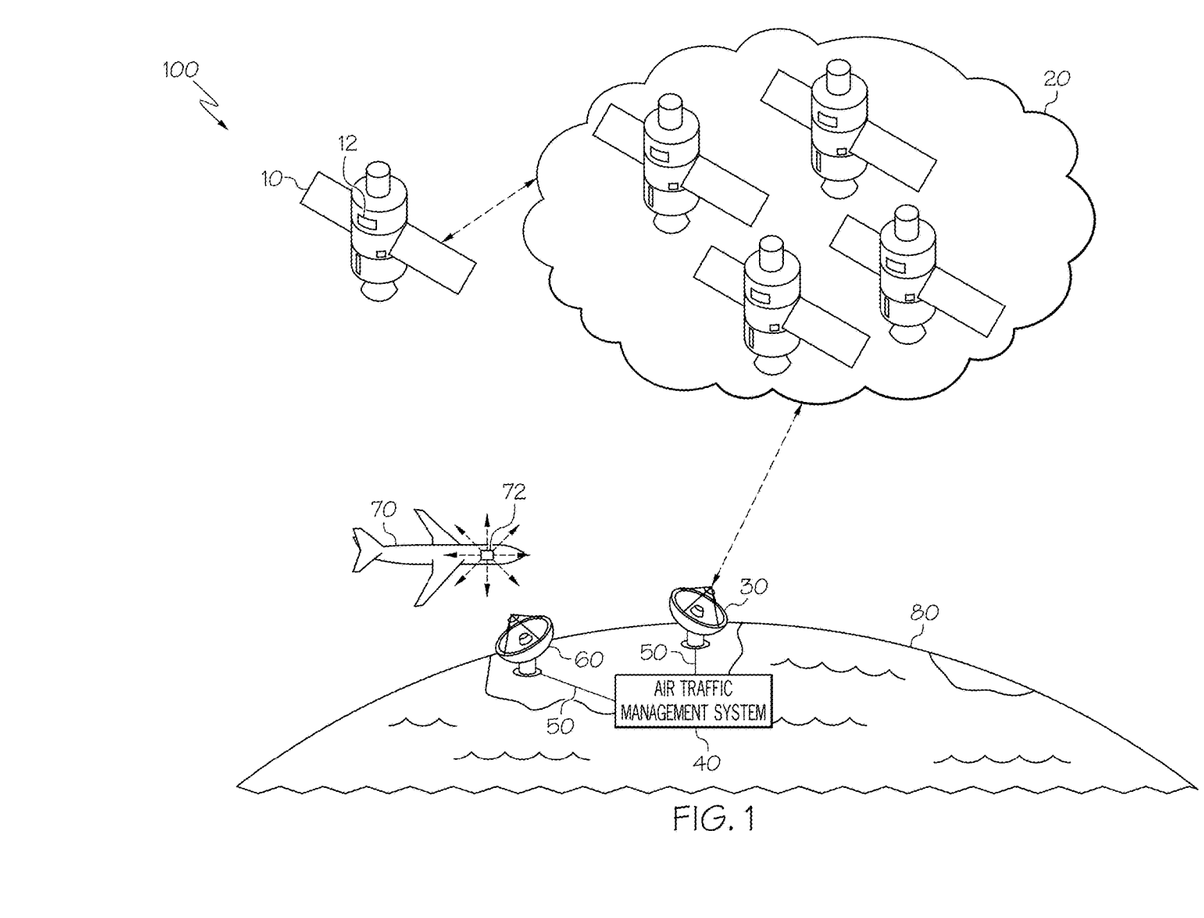
FIG. 1 is a high level block diagram of an example of an air traffic management system ecosystem in accordance with a non-limiting implementation of the present disclosure.

For example and with reference to FIG. 1, a high-level block diagram of one example of a space-based ADS-B system 100 is illustrated in accordance with the present disclosure. System 100 includes satellite 10 in communication with and part of satellite network 20, and aircraft 70. In some implementations, satellite network 20, including satellite 10, may be a low Earth orbit ("LEO") constellation of cross-linked communications satellites. As illustrated in FIG. 1, terrestrial ADS-B ground station 60, air traffic management system 40 and satellite communication network earth terminal 30 are located on Earth 80's surface.

Aircraft 70 carries an on-board ADS-B transponder 72 that broadcasts ADS-B messages containing flight status and tracking information. Satellite 10 carries payload 12 to receive ABS-B messages broadcast by aircraft 70 and other aircraft. In some implementations, multiple or all of the satellites in satellite network 20 may carry ADS-B payload to receive ADS-B messages broadcast by aircraft. Messages received at receiver 12 are relayed through satellite network 20 to satellite communication network earth terminal 30 and ultimately to air traffic management system 40 through terrestrial network 50. The air traffic management system 40 may receive aircraft status information from various aircraft and provide additional services such as air traffic control and scheduling or pass appropriate information along to other systems or entities.

In some implementations, ADS-B payload 12 may have one or more antennas and one or more receivers for receiving ADS-B messages broadcast by aircraft. Additionally or alternatively, in some implementations, ADS-B payload 12 may have a phased array antenna formed from multiple antenna elements that collectively are configured to provide multiple different beams for receiving ADS-B messages.

In certain implementations, satellite network 20 may have a primary mission other than receiving ADS-B messages broadcast by aircraft. For example, in some implementations, satellite network 20 may be a LEO, mobile satellite communications constellation. In such implementations, ADS-B payloads like ADS-B payload 12 may be hosted on satellites 10 of satellite network 20 as hosted or secondary payloads that may be considered secondary to the primary mission of the satellite network 20. Consequently, such ADS-B payloads when operated as hosted payloads may be constrained by certain limitations, such as, for example, a relatively low maximum weight and a relatively low power budget so as not to take away from the primary mission of the satellite network 20.

Terrestrial ADS-B ground station 60 provides aircraft surveillance coverage for a relatively small portion of airspace, for example, limited to aircraft within line of sight of ground station 60. Even if terrestrial ADS-B ground stations like ground station 60 are widely dispersed across land regions, large swaths of airspace (e.g., over the oceans) will remain uncovered. Meanwhile, a spaced-based ADS-B system 100 utilizing a satellite network like satellite network 20 may provide coverage of airspace over both land and sea regions without being limited to areas where ground-based surveillance infrastructure has been installed. Thus, a space-based ADS-B system may be preferable (or a valuable supplement) to terrestrial approaches.

However, implementing a spaced-based ADS-B system, such as, for example, system 100 may present a number of challenges. For example, in certain implementations, individual satellites 10 (or ADS-B payloads 12) may have limited power budgets within which to operate. As such, the individual satellites 10 (or ADS-B payloads 12) may benefit from intelligent management of resources to achieve desired performance levels without exceeding allowed power budgets.

Figure 4:
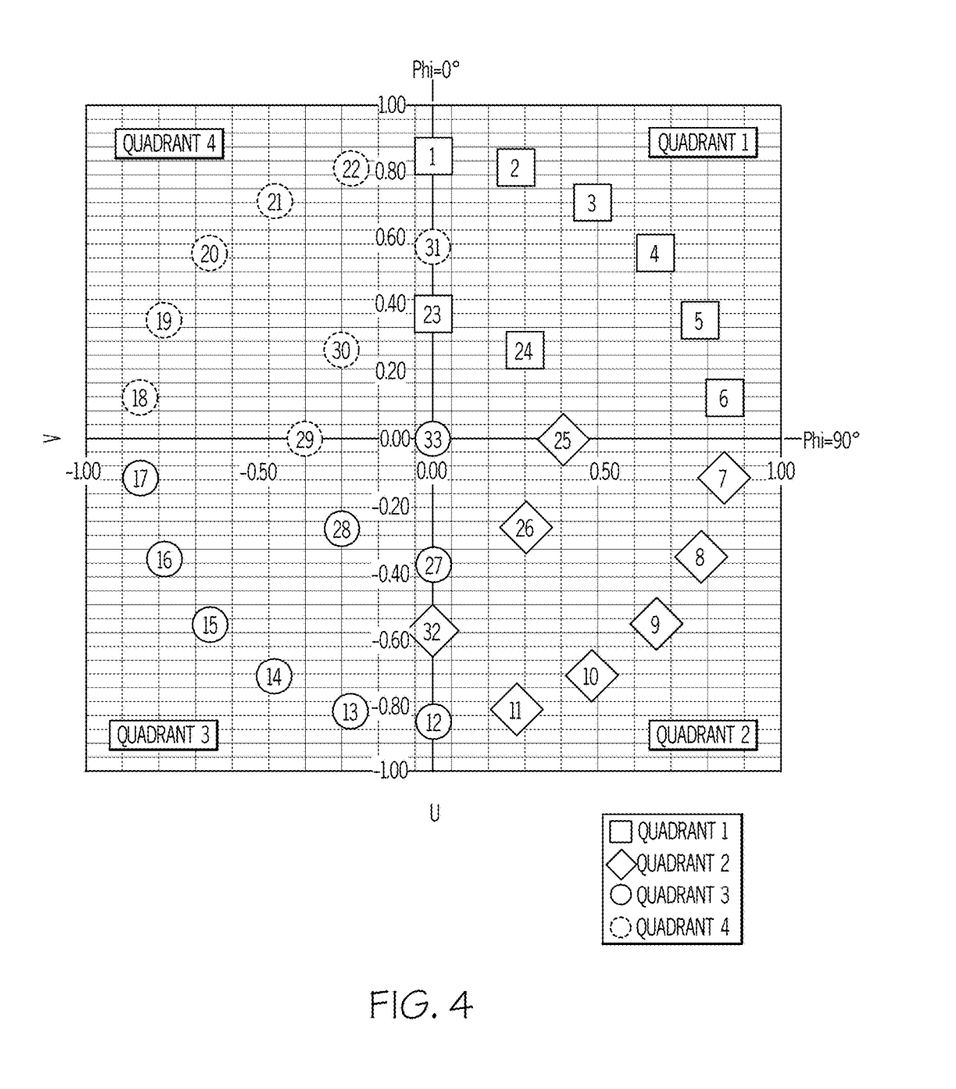
FIGS. 4, 5A-5B, and 6A-6B are illustrations of examples of beam patterns in accordance with a non-limiting implementation of the present disclosure.

In one example, individual satellites 10 (or ADS-B payloads 12) may be configured to provide multiple different coverage beams for receiving ADS-B messages and may benefit from intelligent management of beam scheduling to achieve desired coverage without exceeding allowed power budgets. Referring now to FIG. 4, in one specific implementation, each individual satellite 10 (or ADS-B payload 12) may be configured to have 33 different beams, for example, laid out as illustrated in the example beam pattern illustrated in FIG. 4. However, power (or other resource constraints) may prevent the concurrent use of all 33 beams at the same time. For example, operating all 33 beams at the same time may cause an individual satellite 10 (or ADS-B payload 12) to exceed its allowed power budget. Additionally or alternatively, size and/or processing constraints may not allow for 33 individual receivers on board satellite 10 (or ADS-B payload 12) for concurrently processing signals received in all 33 beams. Therefore, individual satellites 10 (or ADS-B payloads) may benefit from intelligent beam scheduling to achieve desired coverage within the constraints imposed on or by the satellite 10 (or ADS-B payload 12).

The present disclosure describes beam selection and scheduling techniques. While the disclosed beam selection and scheduling techniques generally are described in the context of selecting and scheduling beams of a satellite's (or payload's) antenna for receiving ADS-B messages, the beam selection and scheduling techniques may have broad application and can be employed in a variety of different contexts for the purpose of selecting and scheduling satellite antenna beams. As described in greater detail below, such beam selection and scheduling may be performed on a terrestrial computing platform (or similar resource) with the resultant beam schedules thereafter being uploaded to individual satellites. Additionally or alternatively, individual satellites may perform the beam selection and scheduling techniques disclosed herein themselves.

Figure 2:
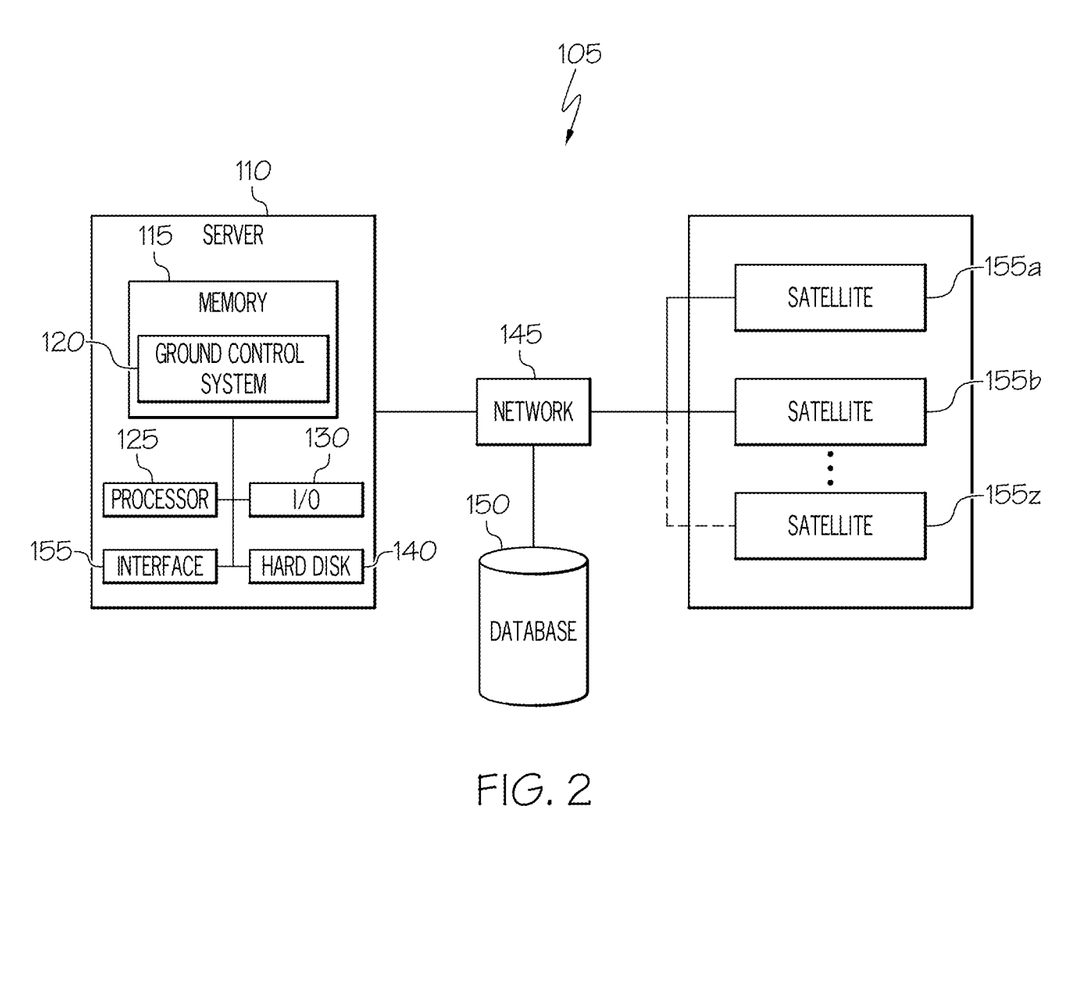
FIG. 2 is a functional block diagram of an example of a ground control system and satellite interaction ecosystem in accordance with a non-limiting implementation of the present disclosure.

FIG. 2 is a functional block diagram of an example of a ground control system and satellite interaction ecosystem 105 in accordance with a non-limiting implementation of the present disclosure. As illustrated in FIG. 2, the ecosystem may include a server or other computing platform 110, a memory 115, a ground control system 120, a processor 125, an interface 155, an input and output ("I/O") device 130, and a hard disk 140. Ground control system 120 processes may be performed on the computing platform 110 shown in FIG. 2. Processor 125 may be operable to load instructions from hard disk 140 into memory 115 and execute those instructions. Memory 115 may store computer-readable instructions that may instruct the computing platform 110 to perform certain processes. I/O device 130 may receive one or more of data from another server, local database, or a network 145. The computing platform 110 may be considered a processing system.

Satellites 155a-155z may include ADS-B payloads or otherwise be configured to receive ADS-B messages broadcast by aircraft. As such, satellites 155a-155z may include antennas that provide multiple beams for receiving ADS-B messages.

Network 145 may facilitate wireless communications of information and provisioning of satellites 155a-155z. For example, the ground control system 120 may communicate with satellites 155a-155z via the network 145. As such, network 145 may include wireless (e.g., radio frequency (RF") uplinks and downlinks for communicating with satellites 155a-155z. Communications sent by the ground control system 120 to satellites 155a-155z via network 145 may include beam selection schedules as described in greater detail below. Similarly, satellites 155a-155z may relay received ADS-B messages through network 145 for terrestrial processing.

The ground control system 120 may also include or have access to a database 150 which may include, for example, additional servers, data storage, and resources. Ground control system 120 may receive additional data from database 150, such as, for example, expected antenna beam gain patterns, information about desired or required coverage areas, available beam patterns, and power budgets available to individual satellites 155.

The ground control system 120 may be configured to perform beam selection and scheduling processes for satellites 155a-155z. In some implementations, to assess coverage of the earth, the ground control system 120 may divide the earth into a grid of 1°×1° tiles over WGS-84 latitude and longitude. Such tiles may be divided into four categories: class one tiles in low update interval service volumes (e.g., update intervals of approximately 10-15 seconds); class two tiles in service volumes that may benefit from special treatment (e.g., tiles near high traffic areas where so-called FRUIT (false replies unsynchronized in time) levels may be expected to be high or tiles where satellite coverage overlap may be low, such as, for instance, near the equator in the case of a constellation of satellites in substantially polar orbits); class three tiles in high update interval service volumes (e.g., update intervals of approximately 30 seconds); and class four tiles where coverage is not desired or provided. In some implementations, an individual class two tile also may be considered to be either a class one tile or a class three tile (e.g., based on the desired update interval for the service volume where the tile is located). These tile classifications may inform, beam selection and scheduling decisions may be ground control system 120.

In some implementations, a space-based ADS-B system is formed from a constellation of satellites in low-Earth orbit (LEO). For example, a space-based ADS-B system may be formed from a number of LEO satellites arranged in some number of substantially polar orbital planes such that the constellation collectively provides coverage of substantially all of the Earth's surface. In one particular implementation, a space-based ADS-B system may be formed from 66 LEO satellites arranged in 6 orbital planes each having 11 satellites in substantially polar orbits. The antennas for receiving ADS-B messages on each of the satellites of such a space-based ADS-B system may be substantially the same and may be configured to provide substantially the same beam patterns. In one particular example, the antennas may be configured to provide 33 beams for receiving ADS-B signals. FIG. 4 illustrates one example of a beam pattern for such an antenna configured to provide 33 beams. In some implementations, the primary mission of the satellites may be to provide the space-based ADS-B system. In other implementations, the satellites may have one or more other missions and the space-based ADS-B system may be implemented by ADS-B payloads hosted on the satellites as hosted or secondary payloads. Therefore, it should be understood that references herein to a satellite or an antenna on board a satellite may refer to a satellite or a satellite's primary payload as well as a hosted or secondary payload and an antenna for a hosted or secondary payload.

Due to power (and/or other) constraints, it may be desirable (or necessary) to use less than a satellite's full complement of beams for receiving ADS-B messages. Therefore, beam selection and scheduling techniques may be performed in an effort to satisfy such constraints while still providing the desired coverage. In some implementations, the beam selection and scheduling techniques may schedule specific beam configurations for defined periods of time, each of which may be subdivided into segments. For example, in one implementation, the beam selection and scheduling techniques may schedule specific beam configurations for defined periods of time that may be referred to herein as beam cycle periods that are further subdivided into four segments (e.g., Segment A, Segment B, Segment C, and Segment D). In some implementations, the time period for a beam cycle period may be configurable. Examples of different time periods for a beam cycle period in different implementations or according to different configurations include 5 seconds, 8 second, and 10 seconds. For each such beam cycle period, the satellite may be assigned a particular power budget, for example, based on whether the satellite is in a position from which solar power is available or in an eclipse position from which solar power is not available because the Earth blocks the sun. The scheduling of the four segments and the different beams that may be turned on and off during individual segments then may be determined in an effort to achieve the desired coverage while satisfying the power budget (and/or other constraints).

A variety of different techniques may be employed to accomplish such beam selection and scheduling during each such beam cycle period for a satellite's antenna. For example, one technique may be referred to as a default sector scan. When a default sector scan is employed, each of the four segments may be assigned to a different quadrant of the antenna's beam pattern (e.g., as depicted in FIG. 4), and all (or some portion of all) of the antenna's beams in an individual quadrant may be turned on during the corresponding segment and off during the other segments. For example, during Segment A, all (or some portion of all) of the antenna's beams in Quadrant 1 may be turned on while all of the antenna's other beams are turned off. Similarly, during Segment B, all (or some portion of all) of the antenna's beams in Quadrant 2 may be turned on while all of the antenna's other beams are turned off. Likewise, during Segment C, all (or some portion of all) of the antenna's beams in Quadrant 3 may be turned on while all of the antenna's other beams are turned off; and, during Segment D, all (or some portion of all) of the antenna's beams in Quadrant 4 may be turned on while all of the antenna's other beams are turned off. In some implementations, the default sector scan technique may be configured to spend an equal dwell time (e.g., 1 second) in each of the four quadrants. Alternatively, in other implementations, the default sector scan may be configured to spend different dwell times in each of the four quadrants (e.g., based on the classifications of tiles within each quadrant). While the default sector scan technique may provide relatively good coverage, a default sector scan also may require a relatively large power budget to operate and, therefore, may not always be a suitable option.

Another technique that may be used to accomplish beam selection and scheduling during a beam cycle period is to turn off all of the antenna's beams during one or more segments and to select one or more different beam patterns during the remaining segments. In one particular example, this technique may involve selecting particular beam patterns to be employed during Segment A and Segment C while turning all of the antenna's beams off during Segment B and Segment D. In this example, the beam patterns selected for Segments A and C may be referred to herein as paired beam patterns. In such an approach, the length of each individual segment may be determined in an effort to comply with the defined power budget for the beam cycle period. For example, if the defined power budget is relatively low, the lengths of Segment B and Segment D, where all of the antenna's beams are turned off, may be scheduled to be relatively long; whereas, if the defined power budget is relatively high, the lengths of Segment B and Segment D may be scheduled to be relatively short. For example, in one implementation, the length of time for each of Segments A and C and the length of time for each of Segments B and D may be calculated according to the following equation:

$$(\text{Beam Cycle Period} - \text{Time On}) = \text{Time On}\left(\frac{\text{Power}_{On} - \text{Power}_{Budget}}{\text{Power}_{Budget} - \text{Power}_{off}}\right)$$

where "Beam Cycle Period" represents the time period for the beam cycle period, "Time On" represents two times the length of time for each of Segments A and C, "Beam Cycle Period" minus "Time On" represents two times the length of time for each of Segments B and D, "Power$_{On}$" represents a measure of the power consumed with the beams turned on during Segments A and C, "Power$_{off}$" represents a measure of the power consumed with the beams turned off during Segments B and D, and "$Power_{Budget}$" is the defined power budget for the beam cycle period.

Additionally or alternatively, in some implementations, the titles to be covered by the satellite during the beam cycle period may be taken into account when determining the length of time for each individual segment. For example, if one or more of the tiles to be covered by the satellite during the beam cycle period are class one tiles for which relatively short update intervals are desired, the lengths of Segment A and Segment C may be scheduled to be relatively long.

Figure 5A:
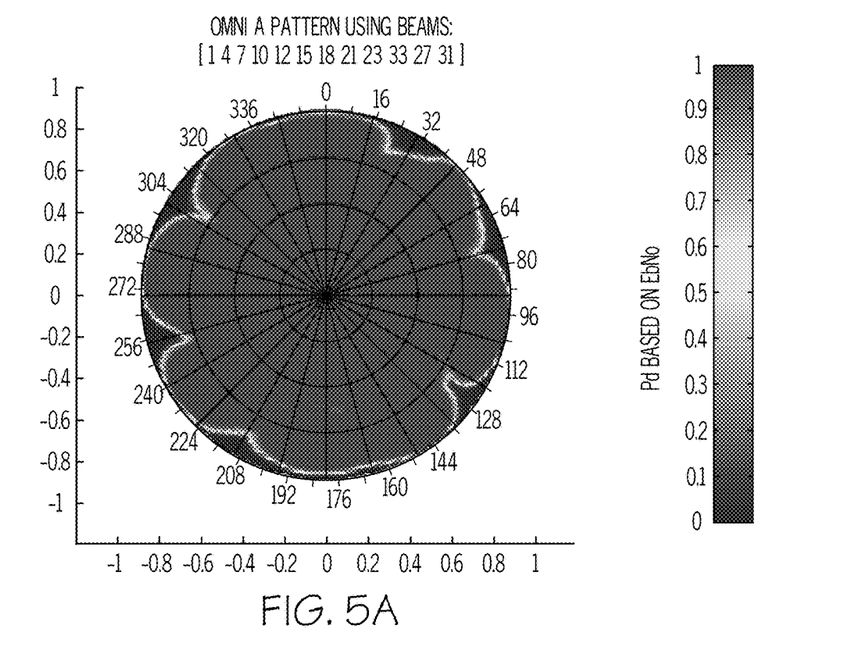
Figure 5B:
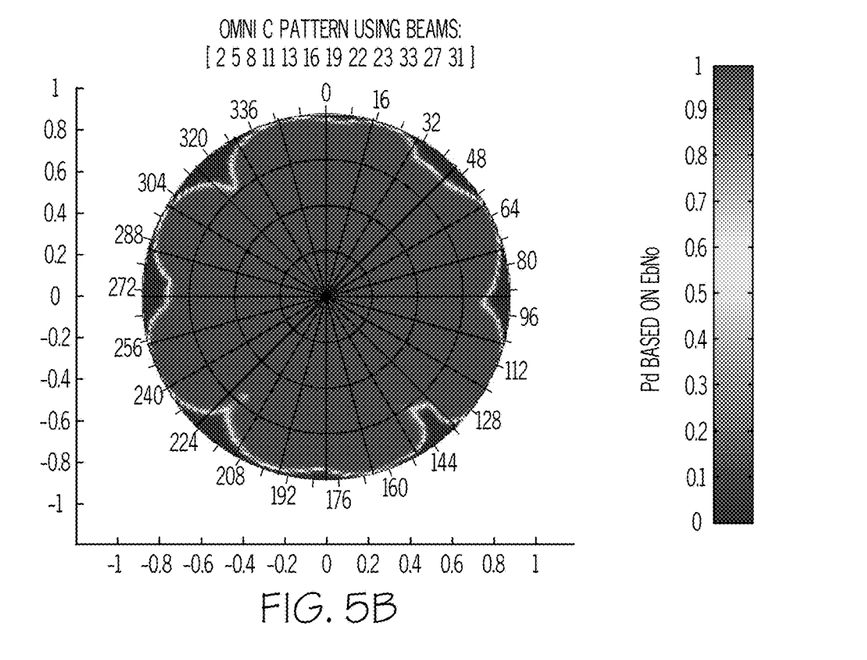

A variety of different beam patterns may be available for selection for Segment A and Segment C. For example, in some cases, a first so-called "Omni" beam pattern that covers nearly all of the azimuth and elevation space within the satellite's coverage footprint may be selected for Segment A and a second "Omni" beam pattern that overlaps with the first "Omni" beam pattern but provides slightly different coverage of the azimuth and elevation space within the satellite's coverage footprint may be selected for Segment C. Referring to the specific example beam configuration illustrated in FIG. 4, the first "Omni" beam pattern for Segment A may employ beams 1, 4, 7, 10, 12, 15, 18, 21, 23, 27, 31, and 33, while the second "Omni" beam pattern for Segment C may employ beams 2, 5, 8, 11, 13, 16, 19, 22, 23, 27, 31, and 33. Plots showing examples of the probability of detection (PD) of ADS-B messages when these two "Omni" beam patterns are used are illustrated in FIG. 5A and FIG. 5B, respectively.

Figure 6A:
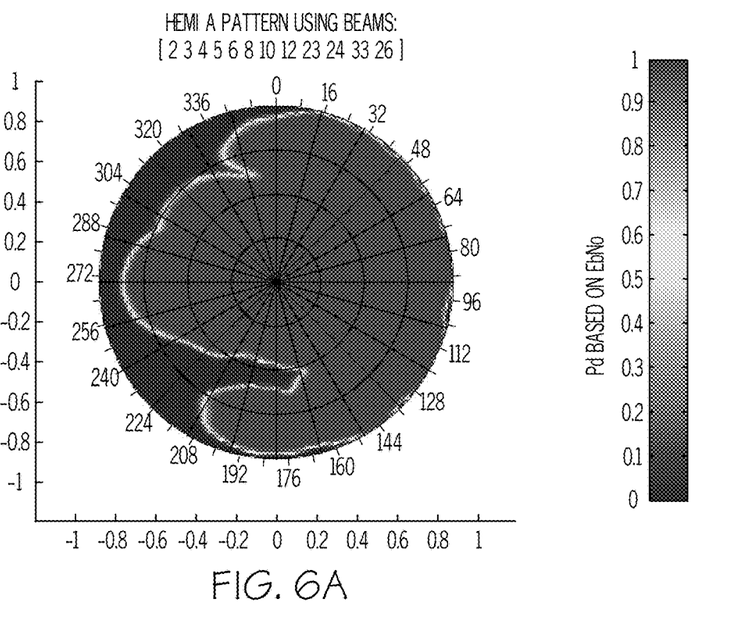
Figure 6B:
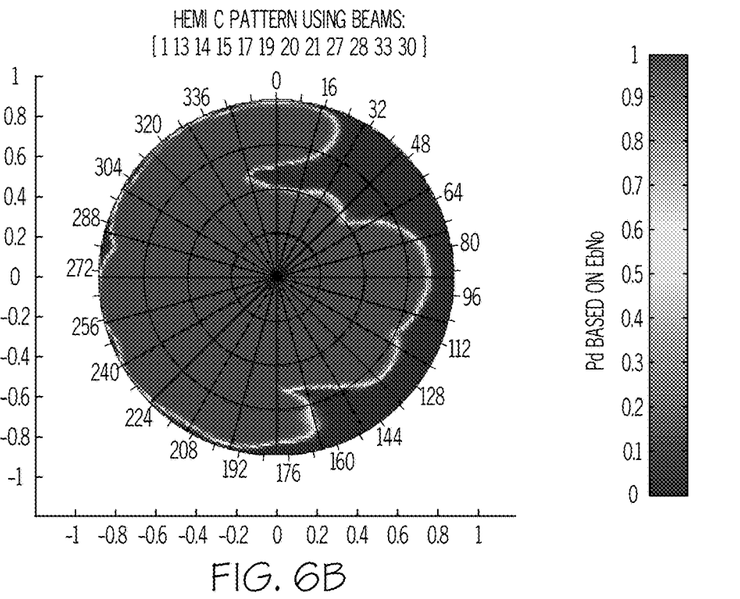

Additionally or alternatively, in some cases, a first so-called "Hemi" beam pattern that approximately covers one half of the azimuth and elevation space within the satellite's coverage footprint may be selected for Segment A and a second "Hemi" beam pattern that approximately covers the other half of the azimuth and elevation space within the satellite's coverage footprint may be selected for Segment C. Referring to the specific example beam configuration illustrated in FIG. 4, the first "Hemi" beam pattern for Segment A may employ beams 2, 3, 4, 5, 6, 8, 10, 12, 23, 24, 26, and 33, while the second "hemi" beam pattern for Segment C may employ beams 1, 13, 14, 15, 17, 19, 20, 21, 27, 28, 30, and 33. Plots showing examples of the probability of detection (PD) of ADS-B messages when these two "hemi" beam patterns are used are illustrated in FIG. 6A and FIG. 6B, respectively.

In some implementations, many additional paired beam patterns may be available for selection for Segment A and Segment C. For example, one example of an additional paired beam pattern may be a so-called "East Hemi" paired beam pattern that focuses coverage within quadrants 1 and 2 of the azimuth and elevation space of the satellite's coverage footprint. Referring to the specific example beam configuration illustrated in FIG. 4, the "East Hemi" beam pattern for Segment A may employ beams 1, 3, 4, 6, 8, 10, 12, 23, 24, 25, 26, and 32, while the "East Hemi" beam pattern for Segment C may employ beams 2, 4, 5, 7, 9, 11, 23, 24, 25, 26, 27, and 31. Alternatively, another example of an additional paired beam pattern may be a so-called "West Hemi" paired beam pattern that focuses coverage within quadrants 3 and 4 of the azimuth and elevation space of the satellite's coverage footprint. Referring to the specific example beam configuration illustrated in FIG. 4, the "West Hemi" beam pattern for Segment A may employ beams 1, 21, 19, 17, 15, 13, 31, 30, 29, 28, 27, and 32, while the "West Hemi" beam pattern for Segment C may employ beams 22, 20, 18, 16, 14, 12, 23, 27, 28, 29, 30, and 31. Numerous other paired beam patterns also may be available. For example, paired beam patterns focusing on individual quadrants also may be available. Additionally or alternatively, paired beam patterns focusing on three quadrants also may be available.

In some implementations, each paired beam pattern may be associated with a set of weights, with each weight corresponding to an individual one of the beams of the satellite's antenna. For example, referring to the specific example beam configuration of 33 beams illustrated in FIG. 4 and recalling the "East Hemi" paired beam pattern described above, the following table illustrates examples of weights assigned to each beam of the satellite's antenna for the purposes of the "East Hemi" paired beam pattern:

| 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|
| 0.4 | 1 | 1 | 1 | 1 | 1 | 1 | 1 | 1 | 1 | 1 | 0.4 | 0 | 0 | −1 | −1 |
| 17 | 18 | 19 | 20 | 21 | 22 | 23 | 24 | 25 | 26 | 27 | 28 | 29 | 30 | 31 | 32 |
| −1 | −1 | −1 | −1 | 0 | 0 | 0.4 | 1 | 1 | 1 | 0.4 | 0 | −1 | 0 | 0.4 | 04 |
| 33 | | | | | | | | | | | | | | | |
| 0.4 | | | | | | | | | | | | | | | |

These sets of weights for each of the available paired beam patterns may be used in the process of selecting an appropriate paired beam pattern for a satellite for a particular beam cycle period. For example, the expected gain (in some cases quantified as the link margin, or the energy per bit to noise power spectral density ratio, $E_b/N_o$) of each beam during the particular beam cycle period may be multiplied by the beam's corresponding weight for each paired beam pattern, and the resulting products for each of the beams of a given paired beam pattern may be summed to generate a score for the paired beam pattern. The paired beam pattern with the highest score for the particular beam cycle period then may be selected as the appropriate paired beam pattern for the particular beam cycle period.

In some implementations, the expected gain for a beam may be a function of one or more different factors. For example, the expected gain for a beam may be a function of the orientation (e.g., angle) of the satellite's antenna (or relevant antenna elements) relative to the coverage area covered by the beam. Additionally or alternatively, the excepted gain for a beam also may take into account the desired coverage area. For example, if the coverage area covered by a beam during a particular period of time covers only tiles for which coverage is not desired, the expected gain for the beam may be set to zero irrespective of the actual expected gain of the beam during that particular period.

In some implementations, the expected gain for a beam may change over time, for example, as the satellite orbits the Earth and the orientation of the satellite's antenna relative to the Earth changes. Consequently, in some implementations, changes to the expected gain for a beam over time may be taken into account in the beam selection processes described herein. For example, in some implementations, a beam score may be calculated for each beam of a satellite's antenna for a particular beam cycle period by dividing the particular beam cycle period into some smaller number of sub-periods (e.g., 10 sub-periods) and calculating the sum (or the average) of the expected gain for the beam across all of the sub-periods. Such beam scores can be used in a number of different ways in the beam selection processes described herein. For example, the beam scores for each of the beams of a satellite's antenna can be multiplied by the corresponding beam weights associated with the paired antenna patterns as part of the process for selecting an appropriate paired antenna pattern as described above.

Figure 7:
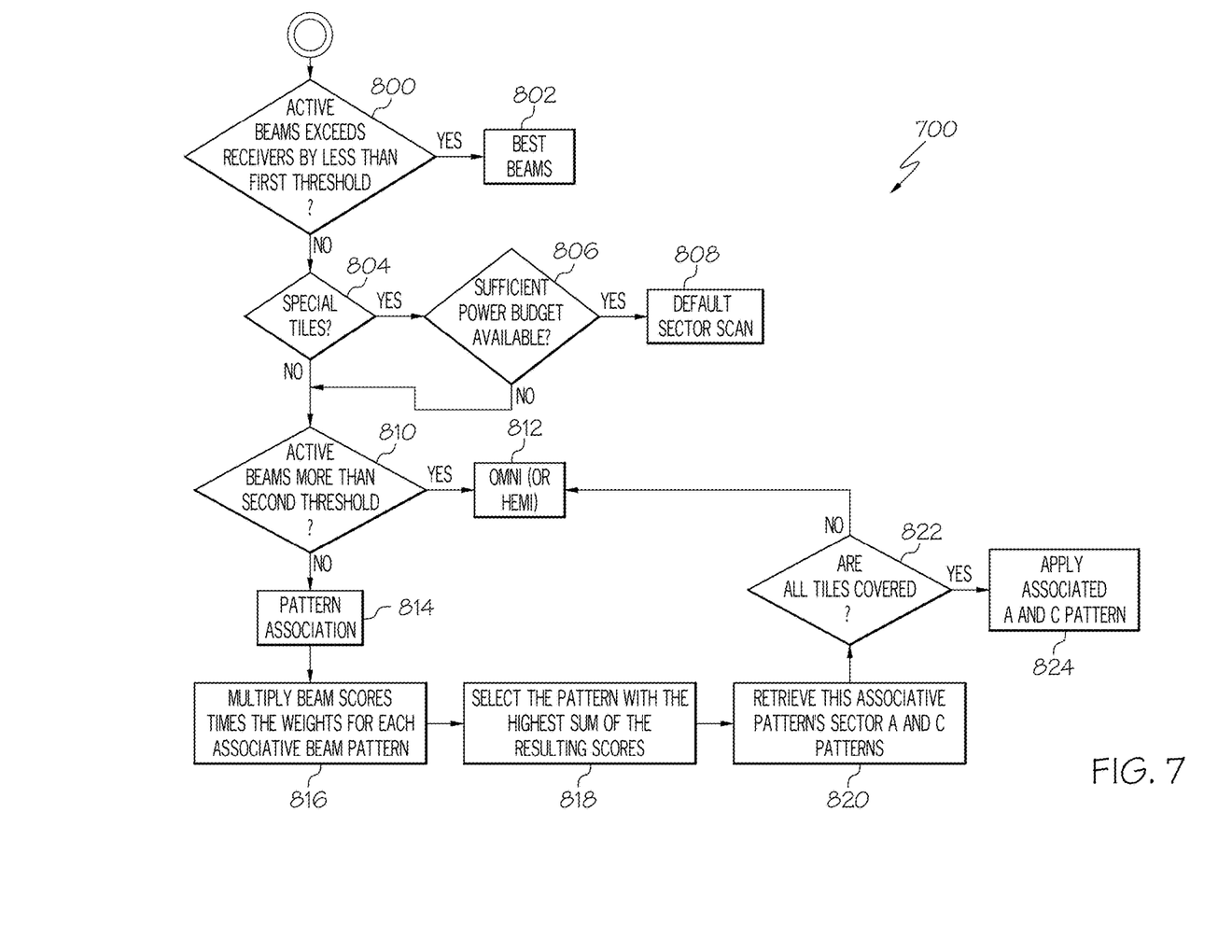
FIG. 7 is a flow chart of an example of a process for selecting a beam configuration in accordance with a non-limiting implementation of the present disclosure.

Referring now to FIG. 7, a flow chart of an example of a process 700 for selecting a beam configuration for the beams of a satellite's antenna during a defined time period (e.g., a beam cycle period) is illustrated in accordance with a non-limiting implementation of the present disclosure. Process 700 may be performed by a ground control system implemented on a computing platform, such as, for example, ground control system 120 implemented on computing platform 110 as illustrated in FIG. 2. In such cases, beam selection schedules generated by performing process 700 may be uploaded to individual satellites 155 and, thereafter, used by the individual satellites 155 to control the beams of the satellites' antennas. Additionally or alternatively, process 700 may be performed by computing resources on board one or more satellites.

In some implementations, process 700 may be performed multiple times and in advance to develop a beam selection schedule for an individual satellite for many defined time periods (e.g., beam cycle periods). For example, in some implementations, process 700 may be performed to generate a forward-looking beam selection schedule for an individual satellite as much as twenty-four hours or more in advance. In such implementations, small portions of such beam selection schedules may be uploaded to the satellites at time. For example, in some implementations, beam selection schedules defining beam selections for 120 second time periods may be uploaded to the satellites. It will be appreciated that process 700 may be performed for each of several different satellites to generate beam selection schedules for each individual satellite.

Referring specifically to FIG. 7, at step 800, a determination is made as to whether the number of active beams of the satellite's antenna during a defined time period (e.g., a beam cycle period) exceeds the number of receivers available on the satellite for processing signals received by the antenna by less a defined first threshold value. In some implementations, an active beam may be considered to be a beam that has a non-zero expected gain during the defined time period or a non-zero beam score during the defined time period. In one example, a satellite may have 12 receivers available for processing signals received by the antenna, and the first threshold value may be 3. In this example, if the satellite's antenna has 14 or fewer active beams, it may be determined at step 800 that the number of active beams exceeds the number of available receivers by less than the first threshold value. Alternatively, if the satellite's antenna has 15 or more active beams, it may be determined at step 800 that the number of active beams does not exceed the number of available receivers by less than the first threshold value.

If it is determined that the number of active beams of the satellite's antenna exceeds the number of available receivers by less than the first threshold value, the process 700 proceeds to step 802. At step 802, a beam selection process is performed that focuses on selecting the best available active beams for the satellite during the defined time period. For example, the defined time period may be subdivided into Segments A, B, C, and D, and beam scores for each beam of the satellite's antenna during the defined time period may be used to rank each of the beams during the defined time period. Some number (e.g., corresponding to the number of receivers available on the satellite) of the top-ranked beams then may be selected to be turned on during each of Segment A and Segment C while all of the beams may be turned off during Segment B and Segment D. For example, continuing with the example of the satellite having 12 receivers introduced above, if the satellite's antenna has 13 active beams during the defined time period, the 12 top-ranked beams may be selected to be turned on during Segment A and the 11 top-ranked beams and the 13th-ranked beam may be selected to be turned on during Segment C.

Returning again to step 800, if it is determined that the number of active beams of the satellite's antenna does not exceed the number of available receivers by less than the threshold value, the process proceeds to step 804. At step 804, a determination is made as to whether any of the tiles that will be within the coverage footprint of the satellite's antenna during the defined time period (or that will be within the coverage footprint of the active beams of the satellite's antenna during the defined time period) may benefit from special treatment, for example, because the tiles are near high traffic areas where FRUIT levels may be expected to be high (perhaps particularly during specific windows of time when traffic is known to usually be high) or because the tiles are located in areas where satellite coverage overlap may be low.

If it is determined that one or more of the tiles that will be within the coverage of the footprint of the satellite during the defined time period may benefit from special treatment, the process 700 proceeds to step 806 where a determination is made as to whether a sufficient power budget is available during the defined time period to support such special treatment. In some implementations, the determination of whether there is a sufficient power budget available during the defined time period may be based on whether there is a sufficient power budget available to support a default sector scan as described above. In such implementations, if it is determined that a sufficient power budget is available during the defined time period, at step 808, a default sector scan may be scheduled for the beams of the satellite's antenna during the defined time period.

If it is determined that no tiles that will be within the coverage footprint of the satellite's antenna during the defined time period will benefit from special treatment or that a sufficient power budget is not available to support such special treatment, the process 700 proceeds to step 810 where a determination is made as to whether the number of active beams of the satellite's antenna will exceed a second threshold value during the defined time period. If it is determined that the number of active beams of the satellite's antenna will exceed the second threshold value during the defined time period, the process 700 proceeds to step 812 where a default paired beam pattern (e.g., one of the "Omni" paired beam pattern or the "Hemi" paired beam pattern described above) is scheduled for the beams of the satellite's antenna during the defined time period.

Alternatively, if it is determined that the number of active beams of the satellite's antenna will not exceed the second threshold value during the defined time period, the process 700 proceeds to step 814 where a pattern association process is initiated. In particular, the defined time period may be subdivided into Segments A, B, C, and D, and, at step 816, the beam scores for each of the antenna's beams during the defined time period are multiplied by the corresponding beam weights for each of several defined paired beam patterns. Thereafter, at step 818, the paired beam pattern for which the sum of the products of the beam scores and beam weights is highest may be selected as the paired beam pattern for the antenna's beams during the defined period of time. At step 820, the actual beam patterns for Segment A and Segment C corresponding to the selected paired beam pattern are retrieved, and, at step 822, a determination is made as to whether all of the tiles for which coverage is desired (e.g., all tiles classified as class 1, class 2, and/or class 3) within the coverage footprint of the satellite's antenna (or within the coverage footprint of the active beams of the satellite's antenna) will be covered by the retrieved beam patterns. If it is determined that all of the tiles for which coverage is desired will be covered by the retrieved beam patterns, the process proceeds to step 824 where the retrieved beam patterns are scheduled for the beams of the satellite's antenna during the defined time period. Alternatively, if it is determined that not all of the tiles for which coverage is desired will be covered by the retrieved beam patterns, the process proceeds to step 812 where a default paired beam pattern (e.g., one of the "Omni" paired beam pattern or the "Hemi" paired beam pattern described above) is scheduled for the beams of the satellite's antenna during the defined time period.

Figure 3:
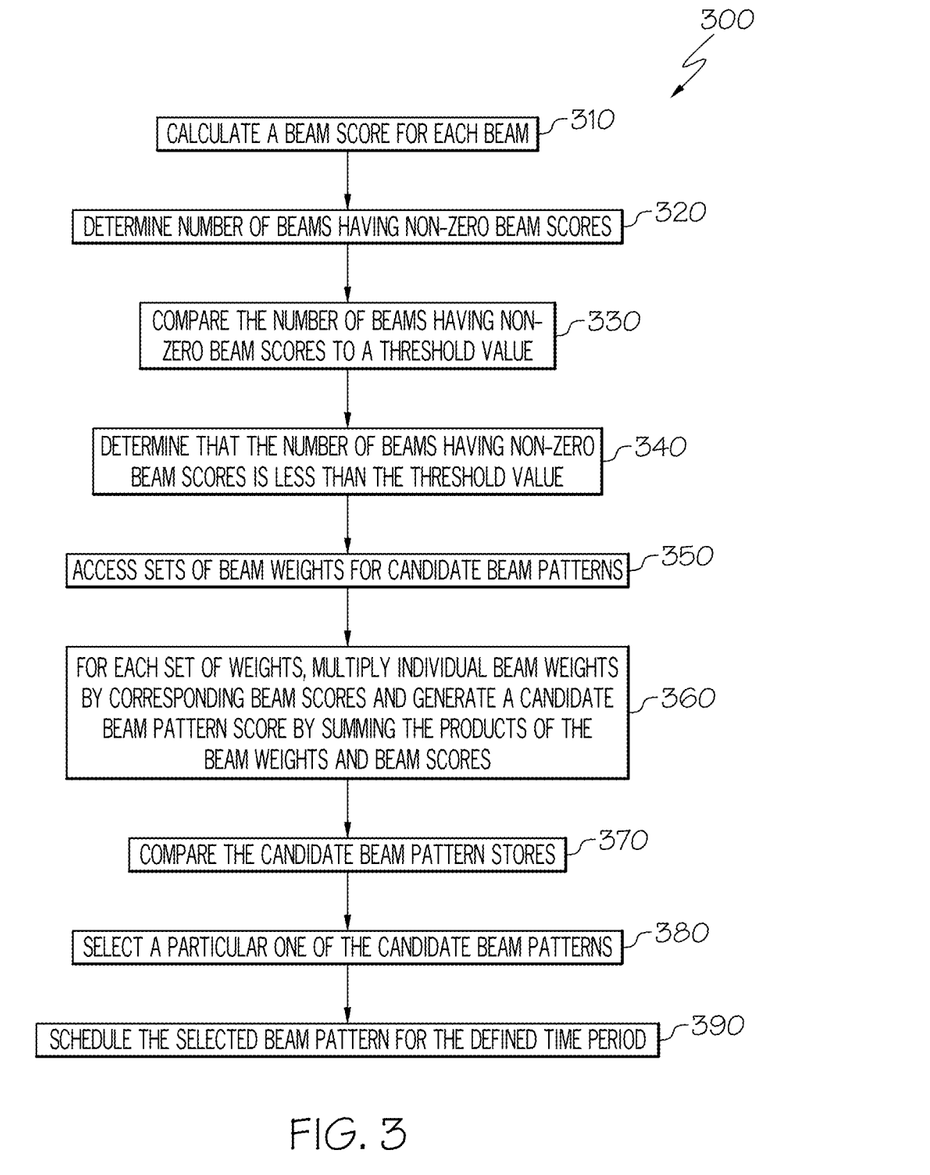
FIG. 3 is a flow chart of an example of a process for selecting a beam configuration in accordance with a non-limiting implementation of the present disclosure.

FIG. 3 is a flow chart of an example of a process 300 for selecting a beam configuration for the beams of a satellite's antenna during a defined time period in accordance with a non-limiting implementation of the present disclosure. Process 300 may be performed by a ground control system implemented on a computing platform, such as, for example, ground control system 120 implemented on computing platform 110 as illustrated in FIG. 2. In such cases, beam selection schedules may be uploaded to individual satellites 155 and, thereafter, used by the individual satellites 155 to control the beams of the satellites' antennas. Additionally or alternatively, process 300 may be performed by computing resources on board one or more satellites. In some implementations, process 300 may be performed multiple times and in advance to develop a beam selection schedule for an individual satellite for multiple defined time periods. It also will be appreciated that process 300 may be performed for each of several different satellites to generate beam selection schedules for each individual satellite.

At step 300, a beam score is calculated for each beam of the antenna based, at least in part, on the expected gain of the beam during the defined time period. In some implementations, the beam score for a beam may be calculated by subdividing the time period into multiple sub-periods and calculating the sum or average of the expected gain of the beam across the sub-periods. Additionally or alternatively, in some implementations, beam scores may take into account desired coverage areas. For example, in some implementations, if the area covered by an individual beam during the defined time period is not an area for which coverage is desired, the beam score for the beam for the defined time period may be set to zero (or some other value to reflect that coverage is not desired for the area covered by the beam during the defined timer period).

At step 320, the number of beams of the antenna having non-zero beam scores during the defined time period is determined. Thereafter, at step 330, the number of beams of the antenna having non-zero beam scores during the defined time period is compared to a threshold value, and, at step 340, it is determined that the number of beams of the antenna having non-zero beam scores during the defined time period is less than the threshold value.

At step 350, as a consequence of having determined that the number of beams of the antenna having non-zero beam scores during the defined time period is less than the threshold value, a set of beam weights for each of multiple different candidate beam patterns, each of which has a weight corresponding to each of the antenna's beams, is accessed. Thereafter, at step 360, for each set of weights, the individual beam weights are multiplied by the corresponding beam scores for each of the beams of the antenna during the defined time period, and a candidate beam pattern score is generated by calculating a sum of the products of the beam weights and corresponding beam scores.

The candidate beam pattern scores for the different candidate beam patterns then are compared at step 370, and, at step 380, a particular one of the candidate beam patterns is selected based on the candidate beam pattern scores. For example, in some implementations, the candidate beam pattern having the highest candidate beam pattern score may be selected. Finally, at step 390, the selected beam pattern is scheduled for the beams of the antenna for the defined time period.

Aspects of the present disclosure may be implemented entirely in hardware, entirely in software (including firmware, resident software, micro-code, etc.) or in combinations of software and hardware that may all generally be referred to herein as a "circuit," "module," "component," or "system." Furthermore, aspects of the present disclosure may take the form of a computer program product embodied in one or more machine-readable media having machine-readable program code embodied thereon.

Any combination of one or more machine-readable media may be utilized. The machine-readable media may be a machine-readable signal medium or a machine-readable storage medium. A machine-readable storage medium may be, for example, but not limited to, an electronic, magnetic, optical, electromagnetic, or semiconductor system, apparatus, or device, or any suitable combination of the foregoing. More specific examples (a non-exhaustive list) of such a machine-readable storage medium include the following: a hard disk, a random access memory (RAM), a read-only memory (ROM), an erasable programmable read-only memory (EPROM or Flash memory), an appropriate optical fiber with a repeater, an optical storage device, a magnetic storage device, or any suitable combination of the foregoing. In the context of this document, a machine-readable storage medium may be any tangible medium that can contain, or store a program for use by or in connection with an instruction execution system, apparatus, or device, such as, for example, a microprocessor.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device. Program code embodied on a machine-readable signal medium may be transmitted using any appropriate medium, including but not limited to wireless, wireline, optical fiber cable, RF signals, etc., or any suitable combination of the foregoing.

Computer program code for carrying out operations for aspects of the present disclosure may be written in any combination of one or more programming languages, including object oriented programming languages, dynamic programming languages, and/or procedural programming languages.

The flowchart and block diagrams in the figures illustrate examples of the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order illustrated in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and machine-readable instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to explain the principles of the disclosure and the practical application, and to enable others of ordinary skill in the art to understand the disclosure with various modifications as are suited to the particular use contemplated.

What is claimed is:

1. A computer-implemented method for scheduling beams of an antenna on board a satellite for receiving Automatic Dependent Surveillance Broadcast (ADS-B messages) during a defined time period comprising:
    for each beam of the antenna, calculating a beam score based, at least in part, on the expected gain of the beam during the defined time period;
    determining a number of beams of the antenna having non-zero beam scores during the defined time period;
    comparing the number of beams of the antenna having non-zero beam scores during the defined time period to a threshold value;
    determining, based on having compared the number of beams of the antenna having non-zero beam scores during the defined time period to the threshold value, that the number of beams of the antenna having non-zero beam scores during the defined time period is less than the threshold value;
    as a consequence of having determined that the number of beams of the antenna having non-zero beam scores during the defined time period is less than the threshold value:
        accessing a set of beam weights for each of multiple different candidate beam patterns, each set of beam weights having a weight corresponding to each of the antenna's beams;
        for each set of weights:
            multiplying individual beam weights by corresponding beam scores for beams of the antenna during the defined time period, and
            generating a candidate beam pattern score by calculating a sum of the products of the beam weights and corresponding beam scores;
        comparing the candidate beam pattern scores for the different candidate beam patterns;
        selecting, based on having compared the candidate beam pattern scores for the different candidate beam patterns, a particular one of the candidate beam patterns; and
        scheduling the selected beam pattern for the beams of the antenna for the defined time period.

2. The computer-implemented method of claim 1, further comprising confirming that the selected beam pattern provides coverage of all desired coverage areas within the coverage footprint of the antenna during the defined time period before scheduling the selected beam pattern for the defined time period.

3. The computer-implemented method of claim 1, further comprising:
    determining an allowed power budget for the antenna during the defined time period;
    dividing the defined time period into at least two active segments and at least two inactive segments; and
    determining lengths of time for the active segments and the inactive segments based on the allowed power budget for the antenna during the defined time period;
    wherein scheduling the selected beam pattern for the defined time period comprises:
        scheduling a first subset of the beams of the antenna to be turned on during a first active segment,
        scheduling all of the beams of the antenna to be turned off during a first inactive segment,
        scheduling a second subset of the beams of the antenna that is different than the first subset to be turned on during a second active segment, and
        scheduling all of the beams of the antenna to be turned off during a second inactive segment.

4. The computer-implemented method of claim 1, wherein scheduling a second subset of the beams of the antenna that is different than the first subset to be turned on during the second active segment comprises scheduling a second subset of the beams of the antenna that is disjoint from the first subset to be turned on during the second active segment.

5. The computer-implemented method of claim 1, wherein scheduling a second subset of the beams of the antenna that is different than the first subset to be turned on during the second active segment comprises scheduling a second subset of the beams of the antenna that overlaps with the first subset to be turned on during the second active segment.

6. The computer-implemented method of claim 1, wherein:
    the method is performed by a terrestrial computing platform; and scheduling the selected beam pattern for the beams of the antenna for the defined time period includes transmitting an indication of the selected beam pattern to the satellite via a wireless communications link.

7. The computer-implemented method of claim 1, wherein calculating a beam score for each beam of the antenna based, at least in part, on the expected gain of the beam during the defined time period includes:
sub-dividing the defined time period into a number of sub-periods;
determining an expected gain of the beam for each sub-period; and
calculating a sum of the expected gains of the beam for each sub-period.

8. The computer-implemented method of claim 1, wherein selecting a particular one of the candidate beam patterns based on having compared the candidate beam pattern scores for the different candidate beam patterns includes selecting the candidate beam pattern having the highest candidate beam pattern score.

9. A system for scheduling beams of an antenna on board a satellite for receiving Automatic Dependent Surveillance Broadcast (ADS-B messages) during a defined time period comprising:
one or more processing elements; and
non-transitory computer-readable memory storing instructions that, when executed by the one or more processing elements, cause the system to:
calculate, for each beam of the antenna, a beam score based, at least in part, on the expected gain of the beam during the defined time period;
determine a number of beams of the antenna having non-zero beam scores during the defined time period;
compare the number of beams of the antenna having non-zero beam scores during the defined time period to a threshold value;
determine, based on having compared the number of beams of the antenna having non-zero beam scores during the defined time period to the threshold value, that the number of beams of the antenna having non-zero beam scores during the defined time period is less than the threshold value;
as a consequence of having determined that the number of beams of the antenna having non-zero beam scores during the defined time period is less than the threshold value:
access a set of beam weights for each of multiple different candidate beam patterns, each set of beam weights having a weight corresponding to each of the antenna's beams;
for each set of weights:
multiply individual beam weights by corresponding beam scores for beams of the antenna during the defined time period, and
generate a candidate beam pattern score by calculating a sum of the products of the beam weights and corresponding beam scores;
compare the candidate beam pattern scores for the different candidate beam patterns;
select, based on having compared the candidate beam pattern scores for the different candidate beam patterns, a particular one of the candidate beam patterns; and
schedule the selected beam pattern for the beams of the antenna for the defined time period.

10. The system of claim 9, wherein the computer-readable memory further stores instructions that, when executed by the one or more processing elements, cause the system to confirm that the selected beam pattern provides coverage of all desired coverage areas within the coverage footprint of the antenna during the defined time period before scheduling the selected beam pattern for the defined time period.

11. The system of claim 9, wherein the computer-readable memory further stores instructions that, when executed by the one or more processing elements, cause the system to:
determine an allowed power budget for the antenna during the defined time period;
divide the defined time period into at least two active segments and at least two inactive segments; and
determine lengths of time for the active segments and the inactive segments based on the allowed power budget for the antenna during the defined time period; wherein the instructions that, when executed by the one or more processing elements, cause the system to schedule the selected beam pattern for the defined time period include instructions that, when executed by the one or more processing elements, cause the system to:
schedule a first subset of the beams of the antenna to be turned on during a first active segment,
schedule all of the beams of the antenna to be turned off during a first inactive segment,
schedule a second subset of the beams of the antenna that is different than the first subset to be turned on during a second active segment, and
schedule all of the beams of the antenna to be turned off during a second inactive segment.

12. The system of claim 9, wherein:
the system is implemented on a terrestrial computing platform; and
the instructions that, when executed by the one or more processing elements, cause the system to schedule the selected beam pattern for the beams of the antenna for the defined time period include instructions that, when executed by the one or more processing elements, cause the system to transmit an indication of the selected beam pattern to the satellite via a wireless communications link.

13. The system of claim 9, wherein the instructions that, when executed by the one or more processing elements, cause the system to calculate a beam score for each beam of the antenna based, at least in part, on the expected gain of the beam during the defined time period include instructions that, when executed by the one or more processing elements, cause the system to:
subdivide the defined time period into a number of sub-periods;
determine an expected gain of the beam for each sub-period; and
calculate a sum of the expected gains of the beam for each sub-period.

14. The system of claim 9, wherein the instructions that, when executed by the one or more processing elements, cause the system to select a particular one of the candidate beam patterns based on having compared the candidate beam pattern scores for the different candidate beam patterns include instructions that, when executed by the one or more processing elements, cause the system to select the candidate beam pattern having the highest candidate beam pattern score.

15. A non-transitory computer-readable storage medium having computer-readable program code embodied thereon for scheduling beams of an antenna on board a satellite for receiving Automatic Dependent Surveillance Broadcast (ADS-B) messages during a defined time period, the computer-readable program code comprising instructions that, when executed by a processor, cause the processor to:

calculate, for each beam of the antenna, a beam score based, at least in part, on the expected gain of the beam during the defined time period;

determine a number of beams of the antenna having non-zero beam scores during the defined time period;

compare the number of beams of the antenna having non-zero beam scores during the defined time period to a threshold value;

determine, based on having compared the number of beams of the antenna having non-zero beam scores during the defined time period to the threshold value, that the number of beams of the antenna having non-zero beam scores during the defined time period is less than the threshold value;

as a consequence of having determined that the number of beams of the antenna having non-zero beam scores during the defined time period is less than the threshold value:

access a set of beam weights for each of multiple different candidate beam patterns, each set of beam weights having a weight corresponding to each of the antenna's beams;

for each set of weights:
multiply individual beam weights by corresponding beam scores for beams of the antenna during the defined time period, and
generate a candidate beam pattern score by calculating a sum of the products of the beam weights and corresponding beam scores;

compare the candidate beam pattern scores for the different candidate beam patterns;

select, based on having compared the candidate beam pattern scores for the different candidate beam patterns, a particular one of the candidate beam patterns; and schedule the selected beam pattern for the beams of the antenna for the defined time period.

16. The computer-readable storage medium of claim 15, further storing instructions that, when executed by the processor, cause the processor to confirm that the selected beam pattern provides coverage of all desired coverage areas within the coverage footprint of the antenna during the defined time period before scheduling the selected beam pattern for the defined time period.

17. The computer-readable storage medium of claim 15, further storing instructions that, when executed by the processor, cause the processor to:

determine an allowed power budget for the antenna during the defined time period;

divide the defined time period into at least two active segments and at least two inactive segments; and determine lengths of time for the active segments and the inactive segments based on the allowed power budget for the antenna during the defined time period; wherein the instructions that, when executed by the processor, cause the processor to schedule the selected beam pattern for the defined time period include instructions that, when executed by the processor, cause the processor to:

schedule a first subset of the beams of the antenna to be turned on during a first active segment, schedule all of the beams of the antenna to be turned off during a first inactive segment, schedule a second subset of the beams of the antenna that is different than the first subset to be turned on during a second active segment, and schedule all of the beams of the antenna to be turned off during a second inactive segment.

18. The computer-readable storage medium of claim 15, wherein the instructions that, when executed by the processor, cause the processor to schedule the selected beam pattern for the beams of the antenna for the defined time period include instructions that, when executed by the one processor, cause the system to transmit an indication of the selected beam pattern to the satellite via a wireless communications link.

19. The computer-readable storage medium of claim 15, wherein the instructions that, when executed by the processor, cause the processor to calculate a beam score for each beam of the antenna based, at least in part, on the expected gain of the beam during the defined time period include instructions that, when executed by the processor, cause the processor to:

subdivide the defined time period into a number of sub-periods;

determine an expected gain of the beam for each sub-period; and calculate a sum of the expected gains of the beam for each sub-period.

20. The computer-readable storage medium of claim 15, wherein the instructions that, when executed by the processor, cause the processor to select a particular one of the candidate beam patterns based on having compared the candidate beam pattern scores for the different candidate beam patterns include instructions that, when executed by the processor, cause the processor to select the candidate beam pattern having the highest candidate beam pattern score.

* * * * *